J. P. TELFORD.
TROLLING HOOK.
APPLICATION FILED APR. 19, 1911.
1,002,785.
Patented Sept. 5, 1911.
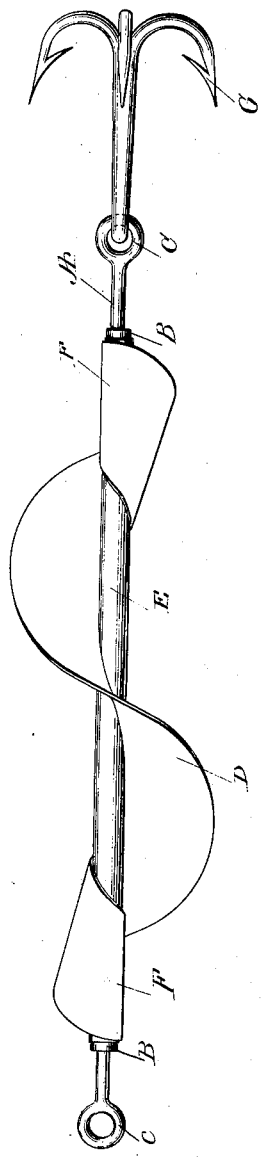
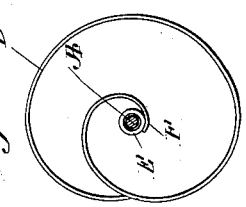
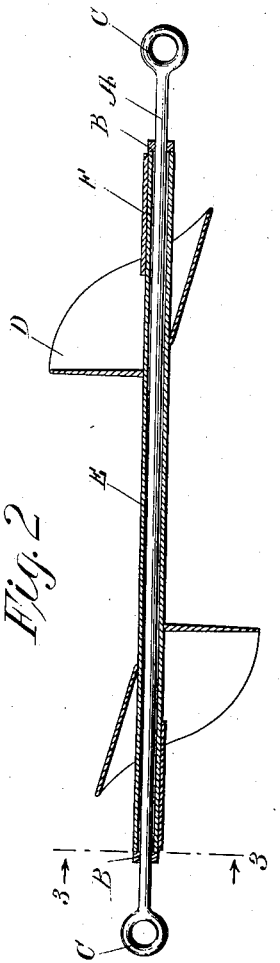
WITNESSES
INVENTOR
James P. Telford
BY
ATTORNEYS

UNITED STATES PATENT OFFICE.

JAMES PATTISON TELFORD, OF OWEN SOUND, ONTARIO, CANADA.

TROLLING-HOOK.

1,002,785.

Specification of Letters Patent.

Patented Sept. 5, 1911.

Application filed April 19, 1911. Serial No. 622,048.

*To all whom it may concern:*

Be it known that I, JAMES PATTISON TELFORD, a subject of the King of Great Britain, and a resident of the town of Owen Sound, in the Province of Ontario and Dominion of Canada, have invented a new and Improved Trolling-Hook, of which the following is a full, clear, and exact description.

My invention relates generally to trolling hooks for fishing, the construction being such that the spoon or bait is rotatably mounted on a rigid spindle whereby, as the hook is drawn through the water, the spoon or bait will be rotated.

The principal object of my invention is to provide a trolling hook having the spoon or bait revolubly mounted thereon so that when in the water, the spoon or bait will be attractive to the fish, the spoon being revolved as the hook is drawn through the water.

A further object of my invention is to provide a trolling hook having a rigid spoon or bait revolubly mounted on the shank of the hook, the construction consisting of few parts, thereby enabling the device to be produced at a low cost.

Reference is to be had to the accompanying drawings forming a part of this specification, in which like characters of reference denote corresponding parts in all the views, and in which—

Figure 1 is a side view of my trolling hook; Fig. 2 is a vertical sectional view thereof, the hook proper being omitted; Fig. 3 is a sectional view thereof, on the line 3—3 of Fig. 2.

My device is made up of the shank or spindle member A having the collars B firmly fastened thereon, opposite ends of the spindle being formed with eyes C for connection with a line and a hook respectively.

The spoon or bait D is of spiral scroll construction and comprises the sleeve portion E freely rotatable on the spindle A between the collars B, the spoon or bait D being firmly fastened to the collar E throughout its length by means of solder or otherwise. The end portions F of the spoon D are brought into engagement with the end portions of the sleeve E, as shown particularly in Fig. 2, this engagement extending along the sleeve for a suitable distance depending on the width of the spoon D. It will also be noted that the central portion of the spoon D extends normally to the sleeve E for a greater distance than the end portions of the spoon, such construction affording a more rigid and substantial device and one in which the revoluble feature of the spoon or bait member is enhanced.

The hook member G may be any suitable form desired; the material of which the various parts are made and the dimensions of these parts may be that which is thought desirable, depending on the different uses in fishing to which the device is put. The spoon or bait D may preferably be made of ribbon, brass or copper, and it may be silver-plated or electro-plated on its sides, or it may be lacquered on one side and plated on the other to suit the waters in which the bait is used; the sleeve E may be made of brass or other metal and the relation between the diameter of the sleeve and the thickness of the spindle A should be such as to permit easy rotation of the spoon on the spindle.

While I have shown my device as made up of certain construction, with a particular form of component parts, it is obvious that many changes may be made in the form, shape and size thereof without departing from the spirit of the invention, as set forth in the following claim.

Having thus described my invention, I claim as new, and desire to secure by Letters Patent:—

In a device of the class described, a shank having eyes at opposite ends thereof, one of the eyes being adapted for connection to a line, the other eye being adapted to sustain a suitable fish hook, a plurality of collars on the shank and adjacent the said eyes, a sleeve inclosing the said shank and rotatable thereon being secured in position by engagement with each of the said collars, a helical spoon secured on the outer surface of the said sleeve, the end portions of the spoon being secured to the sleeve longitudinally thereof, the ends of the said spoon being cut transversely, whereby the portions thereof in engagement with the sleeve are of a length equal to the width of the spoon.

In testimony whereof I have signed my name to this specification in the presence of two subscribing witnesses.

JAMES PATTISON TELFORD.

Witnesses:
WILLIAM PATTISON TELFORD,
MABEL LETHBRIDGE.